United States Patent Office 3,253,330
Patented May 31, 1966

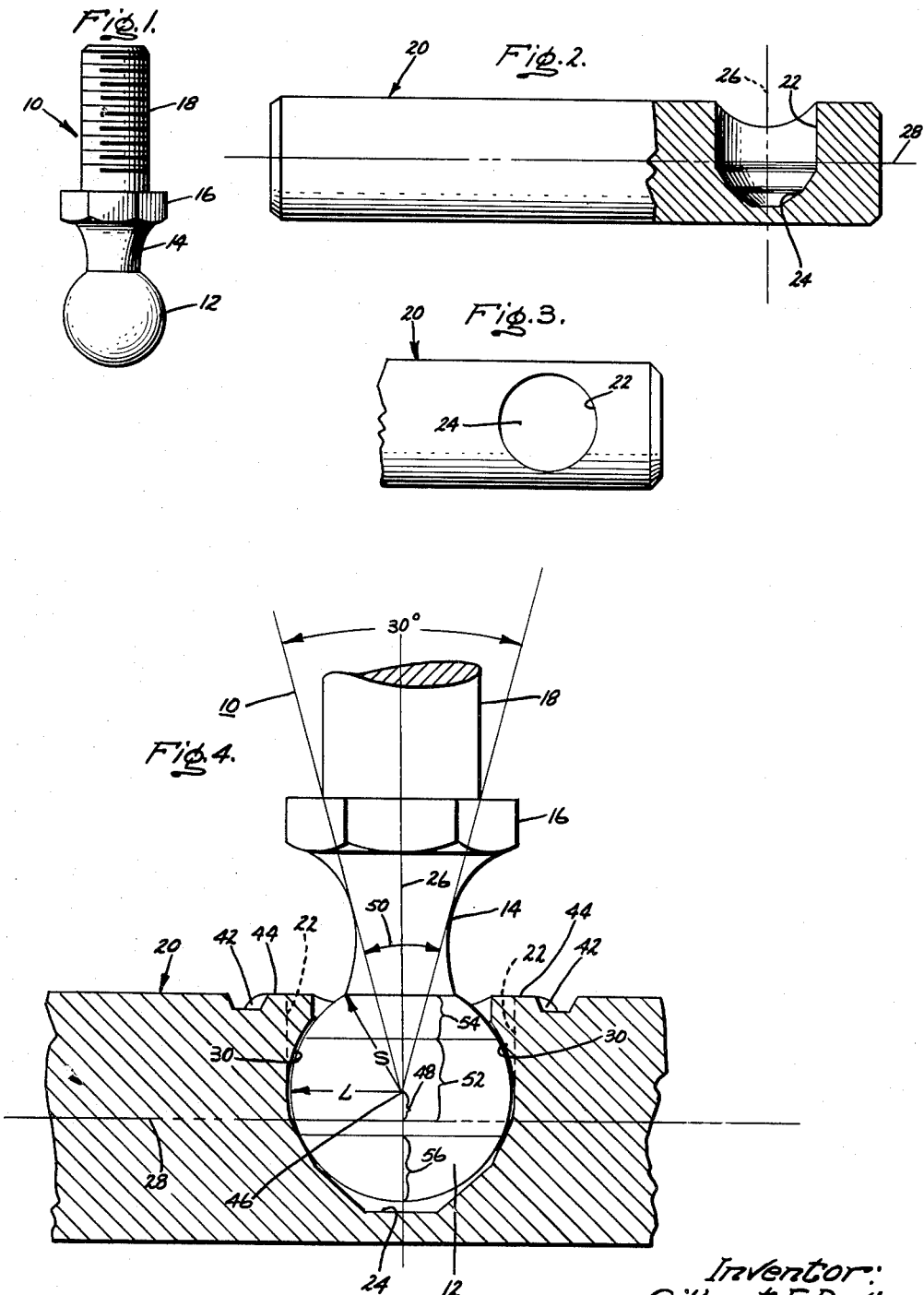

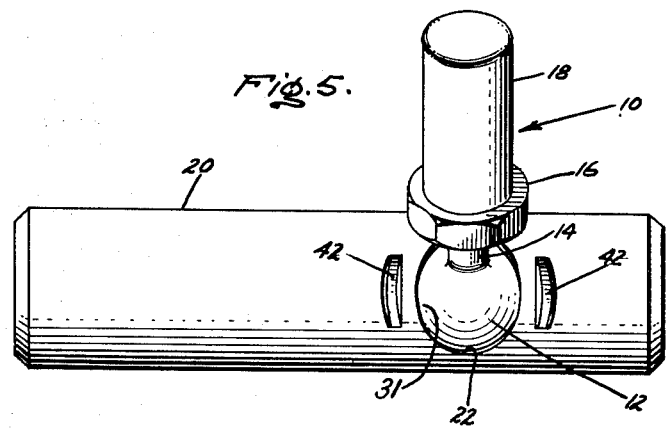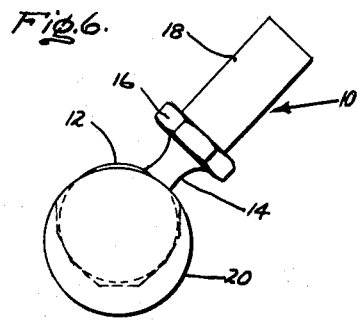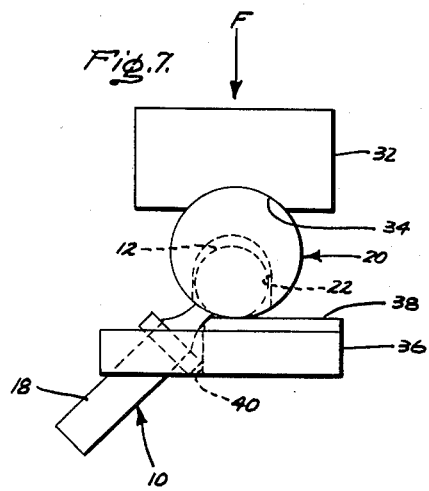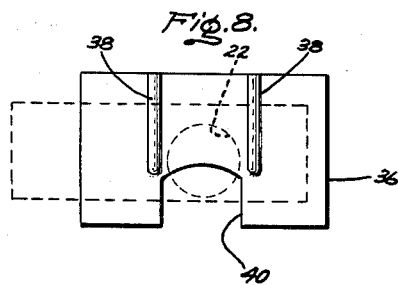

3,253,330
METHOD OF FABRICATING A BALL JOINT ASSEMBLY
Gilbert E. Davies, Fort Wayne, Ind., assignor to Superior Ball Joint Corporation, New Haven, Ind., a corporation of Indiana
Original application Feb. 16, 1961, Ser. No. 89,773. Divided and this application May 14, 1965, Ser. No. 459,145
5 Claims. (Cl. 29—441)

This is a divisional application of application Serial No. 89,773, filed February 16, 1961.

The present invention relates to a ball joint assembly and method of making the same.

A ball joint assembly is conventionally composed of two parts, viz., a body member containing a socket and a ball stud having a ball on one end thereof which is received for swiveling movement by the socket. In many applications for ball joint assemblies, forces of considerable magnitude are applied thereto in a direction which tends to shear off the ball stud. Normally, if a stud shears off, this takes place in the reduced neck portion which in conventional structures is smaller in diameter than any other portion of the ball stud. Therefore, this neck portion is the weakest portion of the ball stud. It is therefore important that the ball joint assembly be so constructed as to provide maximum strength in the neck portion, but at the same time be capable of swiveling through a maximum angle as will be explained in detail hereinafter.

It is also important to provide in ball joint assemblies adequate strength in the socket portion to resist forces which tend to pull the ball out of the socket. In the usual assembly, this requires a fairly deep socket which accommodates suitably strong retaining means for preventing the ball from being forcefully withdrawn from the socket.

Keeping the foregoing in mind, it is an object of this invention to provide an improved method of fabricating a ball joint assembly in a facile, economical and efficient manner.

It is another object of this invention to provide an improved method of fabricating a ball joint by a coining operation using the ball itself as a backing or matrix against which the coining operation is performed.

It is yet another object of this invention to provide an improved ball joint assembly of increased strength as compared with prior assemblies of comparable size.

It is yet another object of this invention to provide an improved ball joint assembly wherein the ball stud has a shorter moment arm than prior studs without sacrificing swivel angle.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of a ball stud which forms a part of one embodiment of this invention;

FIG. 2 is a side elevation partly sectioned of the body member showing one of the first steps in fabricating the invention;

FIG. 3 is a fragmental top plan view of the body member of FIG. 2;

FIG. 4 is a fragmental side view in longitudinal section of a ball joint assembly of this invention;

FIG. 5 is a top plan view of a ball joint assembly of this invention;

FIG. 6 is an end view of the assembly of FIG. 5;

FIG. 7 is an end view of a coining apparatus used in fabricating this invention; and FIG. 8 is a top view of the same apparatus as illustrated in FIG. 7.

Referring to FIG. 1, a ball stud, indicated generally by the reference numeral 10, is provided on one end thereof with a generally spherical ball 12, a reduced diameter neck portion 14 joined to the ball 12, a nut portion 16 joined to the neck portion 14, and a shank 18 which extends axially from the neck and nut portions 14 and 16, respectively. The ball stud 10 is an integral construction preferably formed of steel with the ball 12 being hardened.

In FIG. 2 is illustrated the body member, indicated by the reference numeral 20, of the ball joint assembly, which body member is cylindrical in shape and formed of non-hardened metal such as steel, bronze, brass, aluminum and the like. The material of this body member 20 is deliberately chosen to be softer than the hardened ball 12.

In the right-hand end of the cylindrical body 20 is a cavity 22 of generally cylindrical shape but having a rounded or slightly tapered bottom 24. The axis 26 of the cavity 22, in the preferred embodiment of the invention, is normal to the axis 28 of the body 20. The cavity 22 preferably is formed by a simple drilling operation, the point of the drill, which usually is tapered, forming the bottom 24.

The diameter of the cavity 22 is made just slightly larger than the largest diameter of the ball 12. The cavity 22 is therefore of such size that the ball 12 may be loosely received therein.

FIGS. 4, 5 and 6 illustrate the ball 12 as being received by the cavity 22 which is more clearly illustrated in FIG. 4 as being deformed inwardly slightly to provide a part-spherical socket 30 which substantially conforms to the shape of the upper portion of the ball 12. The method of deforming the cavity so as to provide the contour of the socket 30 will be explained more fully hereinafter. As shown in FIG. 4, a slight clearance is provided between the wall of the socket portion 30 and the ball 12 such that the latter may freely swivel in the socket.

The method of forming the part-spherical socket will now be explained. In addition to FIGS. 4, 5 and 6, reference is made to FIGS. 7 and 8, wherein a coining or punching mechanism is partially illustrated, this mechanism being used in forming the socket 30. First, it should be clearly understood that the ball stud 10 is formed of suitable metal such as steel and that the ball 12 is hardened by suitable heat treatment. In contrast therewith, the metal forming the body member 20 is non-hardened, or, in other words, is soft and thereby subject to deformation.

The coining mechanism of FIGS. 7 and 8 essentially comprises two different parts, a matrix 32 having a part-cylindrical cutout 34 for fitting over the body member 20 and a punch support 36 having two elongated, parallel raised punch edges 38 on the top side thereof, as shown more clearly in FIG. 8. The block 36 is provided with a notch 40 for receiving the shank portion 18 of the ball stud 10 as shown in FIG. 7.

In forming the socket portion 30, the ball 12 (FIG. 1) is first inserted into the cavity 22 (FIG. 2). FIG. 7 illustrates the ball and cavity relationship in dashed lines. The body member 20 with the ball 12 inserted therein is positioned between the matrix 32 and punch block 36 as shown. This positions the punch edges 38 on opposite axial sides of the cavity 22 spaced slightly from the diametrically opposite edges of the cavity. The matrix 32 is thereupon forcefully impacted in the direction of the arrow F (FIG. 7) against the body member 20, thereby forcing the body member against the punch edges 38. By the application of sufficient force in this coining operation, the metal in the body 20 is displaced and deformed inwardly of the cavity 22 against the ball 12 as a backing. In this coining operation, the ball 12, being hardened, serves as a backing for determining the shape of the socket 30. The coining operation displaces metal in the body member 20 against the ball 12 which, being harder than the body metal, resists deformation. The body metal thereby tends to conform to the spherical shape of the ball 12. While the metal of the body is deformed into intimate contact with the ball 12 during the coining operation, when the coining is completed and the coining forces removed from the body 20, the metal of the body springs backwardly slightly due to its inherent resilience. This automatically provides for the clearance shown in FIG. 4 between the socket 30 and the ball 12. In a practical example, this clearance may be .003 of an inch.

While the mechanism of FIGS. 7 and 8 has been illustrated and described in connection with performing the coining operation, it will be understood by persons skilled in the art that the deformations 42 made on opposite sides of the cavity 22 by the punch edges 38 may be made singly and manually by the use of a hammer and suitably shaped punch. The deformations 42 are also illustrated in FIG. 5.

As is more clearly shown in FIG. 4, the coining operation is performed at a short distance (for example, one-eighth of an inch for a body five-eighths inch in diameter) from the edge of the cavity 22, the reference numeral 44 indicating this distance as extending between the cavity edge 22 and the indentation 42. Thus, when the indentation 42 is formed, the lip of the cavity 22 is not necessarily turned in but instead the metal deep in the body 20 is deformed downwardly and inwardly thereby reshaping the entire upper portion of the cavity 22 into the socket portion 30.

It should be noted at this point that the coining indentations 42 are formed on opposite sides of the cavity 22 spaced in a direction extending parallel to the body axis 28. Thus, the deformation of the cavity metal is limited to the length of the indentations 42 transversely of the body 20, as is more clearly shown in FIG. 5. The opposite sides of the cavity 22 transversely of the body 20 are therefore not shaped or deformed by the coining operation, but instead retain their original shapes as segments of a cylinder, the shape of this cylinder being that of the original cavity 22 as illustrated and described in connection with FIG. 2.

Once assembled, the ball 12 is retained in the socket 30 and may freely swivel therein.

Since the coining operation is performed on the top side of the body 20 with respect to the cavity 22, several advantages derive therefrom. Note in FIG. 4 that the centers of the ball 12 and socket 30 are coincident, as generally indicated by the reference numeral 46. This common center point 46 is located on the axis 26 of the cavity 22 and stud 10 when the latter is centered in the socket 30 a distance 48 from the body axis 28, this distance 48 being in a direction toward the open end of the socket 30. This, therefore, positions the ball 12 fairly high in the socket 30 with respect to the body axis 28.

In order to grasp the significance of this particular positioning of the ball 20, it is well to make a comparison of the present structure with one in which the coining indentations 42 may be made at positions spaced 90° from those illustrated in FIG. 5; in other words, by performing the coining operation on the opposite lateral sides of the body 20 adjacent to the cavity 22. In order to deform sufficient metal to retain the ball 12 in the socket, it would obviously be necessary for the socket to be drilled more deeply than that illustrated in FIG. 4 so that the ball 12 could be set more deeply into the body 20. By this means, a sufficient amount of metal would be available for deforming the opposite, transverse sides of the cavity 22 inwardly to retain the ball 12 in the cavity.

However, in comparing these two structures, it is advantageous to position the ball 12 as high as possible in its socket. By so positioning the ball, its swiveling center is elevated toward the open side of the socket. This permits the entire stud 10 to be swiveled through its minimum required angle as indicated by the numeral 50, the sides of this angle 50 being the stud axis 26 when the stud is moved to its opposite extreme positions. With the center 46 being located as illustrated in FIG. 4, it is possible to make the cross-sectional size of the neck portion 14 of the stud 10 larger than would be the case if the center 46 were either on the axis 28 or lower. Thus, it is at once obvious that the required swiveling angle 50 may be achieved while at the same time the size of the neck portion 14 is enlarged. This results in a stronger joint assembly, since the neck portion 14 being enlarged can withstand greater shear forces than would otherwise be possible.

Another advantage arises from the fact that the center 46 is located above the axis 28 such that the moment arm between the ball 12 and the nut portion 16 can be made shorter than would be true if the center 46 were positioned on the axis 28 or lower. Since swiveling action of the ball 12 can result in the nut 16 striking the body 20 and thereby limiting the swivel angle 50, it thereby becomes evident that in any given construction a minimum length in the neck portion 14 is always called for. By positioning the center 46 as illustrated, the length of the neck portion 14 can be made shorter than otherwise possible without the nut 16 striking the body 20 and thereby limiting the swivel angle 50. Shortening the neck 14 renders the same stronger than is true in a design in which the neck portion 14 is longer.

Thus far, the ball 12 has been described as being generally spherical. In the preferred design, the ball 12 is provided with two different diameter portions, the circumferential intermediate portion indicated by the reference numeral 52 having a larger radius than the upper segmental or chord portion 64 and the lower segmental or chord portion 56. Thus, the ball 12 is slightly out of round.

In a typical design for a ball 12 of generally one-half (½) inch diameter, the diameter of the portion 52 may be about .050 inch larger than that for the remaining ball portions 54 and 56; however, the difference in dimensions may vary, as will become apparent from the following description.

In deforming the cavity 22 to form the socket 30, and assuming that the coining indentations 42 are made one at a time, the ball stud 10 is swung to one side of the cavity 22. For example, if the left-hand identation 42 (FIG. 4) is to be formed, the stud 10 is swung to its extreme right-hand position against the edge of the cavity 22. In this position, the larger diameter intermediate ball portion 52 is swung upwardly and immediately opposite that portion of the cavity 22 which will be deformed by the coining operation. In this position of the stud, the left-hand indentation 42 is formed, thereby displacing the body metal into contact with the larger diameter portion 52. Following this, the ball stud 10 is swung to its extreme leftward position (FIG. 4) and the right-hand indentation 42 is formed again against the larger diameter ball portion 52.

Now when the ball stud 10 is swung to its centered position as illustrated in FIG. 4, the smaller diameter portion 54 of the ball is moved into the clearance of the socket 30 which was automatically provided when the metal was coined against the larger diameter portion 52. It will thus be seen that the ball 12 can never wedge or lock in the socket 30 if it is formed as just described.

In other words, adequate swiveling clearance for the ball 20 in the socket 30 is automatically provided for.

Referring once again to FIGS. 7 and 8, it will be noted that the ball stud 10 is swung to its extreme transverse position in the body 20 during the coining operation by the mechanism 32, 36. By positioning the stud 10 against the opposite transverse edge of the cavity 22 as illustrated in FIG. 7, the larger diameter ball portion 52 is essentially positioned opposite the portions of the cavity 22 which are deformed by the indentations 42. Thus, the proper swiveling clearances for the ball 12 are provided when the coining operation is performed either by means of the mechanism illustrated in FIGS. 7 and 8 or manually as previously described.

As will now be appreciated, the fabrication of the ball joint assembly of this invention is vastly simplified by forming the ball 12 of hardened metal and the body 20 of softer metal. This permits the softer metal to be coined for the purpose of conforming the socket around the ball, the ball serving as a backing which resists deformation.

With respect to the ball joint assembly itself, it has greater strength for withstanding shear and bending forces by reason of the fact that the neck portion 14 is larger in diameter than is customary and the length thereof is shorter. This increased strength is a direct result of coining in the locations 42 disclosed hereinbefore. This increased strength is accomplished without reducing the swivel angle of the stud.

While I have described above the principles of my invention in connection with specific apparatus, it is to be clearly understood that this description is made only by way of example and not as a limitation to the scope of my invention.

What is claimed is:

1. The method of fabricating a ball joint assembly which comprises a cylindrical body of non-hardened metal and a ball stud having a hardened metal ball on one end thereof comprising the steps of drilling a socket in one side of said body on an axis which is normal to the axis of said body, inserting the hardened ball into said socket, and deforming metal of said non-hardened body into said socket against said hardened ball as a backing to the shape of the ball contour, said deforming step being performed on opposite sides of said socket spaced in a direction parallel to the body axis.

2. The method of fabricating a ball joint assembly which comprises a cylindrical body of non-hardened metal and a ball stud having a hardened metal ball on one end thereof comprising the steps of drilling a socket in one side of said body on an axis which is transverse to the axis of said body, inserting the hardened ball into said socket, and coining the metal of said body into said socket against said ball as a backing to the shape of the ball contour, said coining step being performed simultaneously on opposite sides of said socket spaced in a direction parallel to the body axis.

3. The method of fabricating a ball joint assembly which comprises an elongated body of metal and a ball stud having a metal ball on one end thereof comprising the steps of forming a socket in one side of said body on an axis which is transverse to the axis of said body, inserting the ball into said socket, and displacing metal of said body into said socket toward said ball to an extent at which the distance between facing surface portions of the displaced metal measured in a direction parallel to the body axis is shorter than the maximum dimension of said ball thereby confining said ball in said socket, said displacing step being performed on opposite sides of said socket spaced in a direction parallel to the body axis and to an extent which provides a clearance between the displaced metal and said ball whereby the latter may swivel in said socket.

4. The method of fabricating a ball joint assembly which comprises a cylindrical body of non-hardened metal and a ball stud having a hardened metal ball on one end thereof comprising the steps of forming a socket in one side of said body on an axis which is transverse to the axis of said body, inserting the hardened ball into said socket, and deforming metal of said non-hardened body into said socket against said hardened ball as a backing to the shape of the ball contour, said deforming step being performed on opposite sides of said socket spaced in a direction parallel to the body axis.

5. The method of fabricating a ball joint assembly of improved strength; said assembly including an elongated metallic body and a metallic ball stud, said ball stud having an elongated shank and a ball on one end thereof, said shank having a longitudinal axis coincident with a diametral axis of said ball; comprising the steps of (a) forming a cylindrical socket in said body on an axis which is transverse to the axis of said body, the diameter of said socket being substantially equal to the diameter of said ball, (b) inserting said ball into said socket, (c) displacing the metal of said body into said socket, (d) said displacing step being performed on opposite sides of said socket spaced in a direction parallel to the body axis, and (e) controlling said displacing step to the extent of reducing the width of the mouth of said socket so as to retain said ball therein and of permitting said ball to pivot in said socket without frictional binding.

References Cited by the Examiner

UNITED STATES PATENTS

| | | | |
|---|---|---|---|
| 1,031,982 | 7/1912 | Caswell | 29—441 |
| 2,922,670 | 1/1960 | Davis | 287—90 |

JOHN F. CAMPBELL, *Primary Examiner.*

THOMAS H. EAGER, CARL W. TOMLIN, A. V. KUNDRAT, *Examiners.*